US011769872B2

(12) United States Patent
Huang et al.

(10) Patent No.: US 11,769,872 B2
(45) Date of Patent: Sep. 26, 2023

(54) PRE-LITHIATED SILICON PARTICLES AND METHODS OF FORMING THE SAME

(71) Applicant: GM GLOBAL TECHNOLOGY OPERATIONS LLC, Detroit, MI (US)

(72) Inventors: Xiaosong Huang, Novi, MI (US); Zhongyi Liu, Troy, MI (US); Bradley R. Frieberg, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 17/204,126

(22) Filed: Mar. 17, 2021

(65) Prior Publication Data
US 2022/0302435 A1 Sep. 22, 2022

(51) Int. Cl.
*H01M 4/04* (2006.01)
*H01M 4/1395* (2010.01)
*H01M 10/0525* (2010.01)
*H01M 4/38* (2006.01)
(Continued)

(52) U.S. Cl.
CPC ....... *H01M 4/1395* (2013.01); *H01M 4/0404* (2013.01); *H01M 4/0409* (2013.01); *H01M 4/366* (2013.01); *H01M 4/382* (2013.01); *H01M 4/386* (2013.01); *H01M 10/0525* (2013.01);
(Continued)

(58) Field of Classification Search
CPC .................................................. H01M 4/134
See application file for complete search history.

(56) References Cited

U.S. PATENT DOCUMENTS

| 8,440,350 B1 | 5/2013 | Verbrugge et al. |
| 8,859,144 B2 | 10/2014 | Kiao |
| 8,999,584 B2 | 4/2015 | Jiang et al. |
| (Continued) | | |

FOREIGN PATENT DOCUMENTS

| CN | 115117329 A | 9/2022 |
| DE | 102021132903 A1 | 9/2022 |

OTHER PUBLICATIONS

Koestner, Roland J. et al., U.S. Appl. No. 17/159,978, filed Jan. 27, 2021 entitled, "Carbon-Based Conductive Filler Precursor Dispersions for Battery Electrodes and Methods for Making and Use Thereof," 61 pages.
(Continued)

*Primary Examiner* — Austin Murata
(74) *Attorney, Agent, or Firm* — Harness, Dickey & Pierce, P.L.C.

(57) ABSTRACT

The present disclosure provides a method of making a negative electrode material for an electrochemical cell that cycles lithium ions. The method includes centrifugally distributing a precursor including silicon, lithium, and an additional metal (M) selected from the group consisting of: aluminum (Al), chromium (Cr), titanium (Ti), niobium (Nb), molybdenum (Mo), zirconium (Zr), yttrium (Y), cerium (Ce), and combinations thereof by contacting the precursor with a rotating surface in a centrifugal atomizing reactor and solidifying the precursor to form a plurality of substantially round solid electroactive particles that include $Li_{4.4x}Si_xM_y$, where x is greater than 0 to less than or equal to about 0.85 and y corresponds to a weight percent of M that is greater than or equal to 0.1 wt. % to less than or equal to about 10 wt. %.

17 Claims, 4 Drawing Sheets

(51) Int. Cl.
  *H01M 4/36*   (2006.01)
  *H01M 4/02*   (2006.01)

(52) U.S. Cl.
  CPC .............. *H01M 2004/021* (2013.01); *H01M 2004/027* (2013.01)

(56) References Cited

U.S. PATENT DOCUMENTS

| | | | |
|---|---|---|---|
| 9,005,811 B2 | 4/2015 | Kiao et al. |
| 9,093,705 B2 | 7/2015 | Kiao et al. |
| 9,142,830 B2 | 9/2015 | Kiao et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,780,361 B2 | 10/2017 | Xiao et al. |
| 10,062,898 B2 | 8/2018 | Xiao |
| 10,164,245 B2 | 12/2018 | Huang |
| 10,854,882 B2 | 12/2020 | Halalay et al. |
| 10,868,307 B2 | 12/2020 | Huang |
| 10,950,846 B2 | 3/2021 | Xiao et al. |
| 11,228,037 B2 | 1/2022 | Huang et al. |
| 11,349,119 B2 | 5/2022 | Halalay et al. |
| 11,424,442 B2 * | 8/2022 | Frieberg .................. C23C 16/26 |
| 2016/0087267 A1 * | 3/2016 | Yoshio .................. H01M 4/366 |
| | | | 429/231.95 |
| 2017/0170473 A1 * | 6/2017 | Peled .................... H01M 4/387 |
| 2018/0190977 A1 * | 7/2018 | Park ...................... H01M 4/362 |
| 2018/0205114 A1 | 7/2018 | Pauric et al. |
| 2020/0020948 A1 | 1/2020 | Huang et al. |
| 2020/0020949 A1 | 1/2020 | Huang |
| 2020/0119339 A1 | 4/2020 | Halalay et al. |
| 2020/0127292 A1 | 4/2020 | Halalay et al. |
| 2020/0266432 A1 * | 8/2020 | Yamaguchi ....... H01M 10/0525 |
| 2022/0238885 A1 | 7/2022 | Koestner et al. |

OTHER PUBLICATIONS

Li, Juchuan et al., "Atomic Layered Coating Enabling Ultrafast Surface Kinetics at Silicon Electrodes in Lithium Ion Batteries," J. Phys. Chem. Lett. (2013) 4, 20, pp. 3387-3391; (Published Sep. 24, 2013) DOI: 10.1021/jz4018255 (Abstract Only).

Li, Xuemin et al., "Study of Lithium Silicide Nanoparticles as Anode Materials for Advanced Lithium Ion Batteries," ACS Appl. Mater Interfaces (2017), 9 pp. 16071-16080; (Published: Apr. 28, 2017) DOI: 10.1021/acsami.6b16773.

Wang, Shuai et al., "High temperature oxidation behavior of heat resistant steel with rare earth element Ce," Mater. Res. Express (2020) 7, 016571; (Published: Jan. 20, 2020) DOI: 10.1088/2053-1591/ab692d.

* cited by examiner

PRE-LITHIATED SILICON PARTICLES AND METHODS OF FORMING THE SAME

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% to less than or equal to about 30% after the first cycle, and in the instance of silicon-containing negative electrodes, an irreversible capacity loss of greater than or equal to about 20% to less than or equal to about 40% after the first cycle. Accordingly, it would be desirable to develop improved electrodes and electroactive materials, and methods of making and using the same, that can address these challenges.

SUMMARY

This section provides a general summary of the disclosure, and is not a comprehensive disclosure of its full scope or all of its features.

The present disclosure pertains to prelithiated electroactive materials for an electrochemical cell that cycles lithium ions and to methods of forming the prelithiated electroactive materials. The prelithiated electroactive materials may include spherical lithium-silicon particles and a passive surface film or passivation layer coated thereon. Methods may include centrifugally distributing a molten precursor in a centrifugal atomizing reactor, where the molten precursor includes a silicon alloy powder defined by $Li_{4.4x}Si_xM_y$, where x is greater than 0 to less than or equal to about 0.85, M at least one of aluminum (Al), chromium (Cr), titanium (Ti), niobium (Nb), molybdenum (Mo), zirconium (Zr), yttrium (Y), and cerium (Ce), and y corresponds to a weight percent of M that is greater than or equal to 0.1 wt. % to less than or equal to about 10 wt. %.

In various aspects, the present disclosure provides a method of making a negative electrode material for an electrochemical cell that cycles lithium ions. The method including contacting a precursor including silicon, lithium, and a metal (M) selected from the group consisting of: aluminum (Al), chromium (Cr), titanium (Ti), niobium (Nb), molybdenum (Mo), zirconium (Zr), yttrium (Y), cerium (Ce), and combinations thereof with a rotating surface in a centrifugal atomizing reactor and solidifying the precursor to form a plurality of substantially round solid electroactive particles. The solid electroactive particles including $Li_{4.4x}Si_xM_y$, where x is greater than 0 to less than or equal to about 0.85 and y corresponds to a weight percent of M that is greater than or equal to 0.1 wt. % to less than or equal to about 10 wt. %.

In one aspect, the rotating surface may include one or more metal coatings. Each metal coating may include one or more of gold (Au), aluminum (Al), and silver (Ag). Each metal coating may have a thickness greater than or equal to about 0.01 μm to less than or equal to about 0.1 μm.

In one aspect, the method may further include for each of the substantially round solid electroactive particles of the plurality of substantially round solid electroactive particles, passivating the metal (M) to form a passivation coating on the exposed surfaces of each of the substantially round solid electroactive particles.

In one aspect, passivating the metal (M) may include exposing the plurality of substantially round solid electroactive particles to oxygen or nitrogen.

In one aspect, a temperature in the centrifugal atomizing reactor may be greater than or equal to 400° C. to less than or equal to 1,000° C. during the centrifugally distributing.

In one aspect, an environment in the centrifugal atomizing reactor may have less than or equal to about 0.5% by weight of any oxygen-bearing species.

In one aspect, a flow rate of the centrifugal atomizing reactor may be greater than or equal to 50 kg/hour to less than or equal to about 500 kg/hour.

In one aspect, an average D50 diameter of the plurality of substantially round solid electroactive particles may be greater than or equal to about 1 μm to less than or equal to about 20 μm.

In one aspect, the plurality of substantially round solid electroactive particles may have a polydispersity index of less than or equal to about 1.2.

In one aspect, the method may further include preparing the precursor. Preparing the precursor may include forming an admixture by contacting a first material including lithium and having a first temperature and a second material including silicon and having a second temperature in a mixing chamber to form the first admixture. The first material and the second material may each enter the mixing chamber at a pressure greater than or equal to about 10 PSI. The second temperature may be greater than the first temperature.

In one aspect, the first temperature may be at or greater than a melting point temperature of lithium, and the second temperature may be at or greater than a melting point temperature of silicon.

In one aspect, the contacting may occur by introducing lithium from a lithium source to the mixing chamber using a first supply line and introducing silicon from a silicon source to the mixing chamber using a second supply line.

In one aspect, the first supply line may include a first metering pump and the second supply line may include a second metering pump. The first metering pump may control the pressure and rate at which the lithium enters the mixing chamber. The second metering pump may control the pressure and rate at which the silicon enters the mixing chamber.

In one aspect, the method may further include removing the admixture from the mixing chamber, adding the additional metal (M) to the admixture, and heating the admixture and metal (M) to form the precursor.

In various aspects, the present disclosure provides a method of making a negative electrode material for an electrochemical cell that cycles lithium ions. The method may include contacting a first material including lithium and having a first temperature and a second material including silicon and having a second temperature in a mixing chamber to form a precursor. The first material and the second material may each enter the mixing chamber at a pressure greater than or equal to about 10 PSI. The first temperature may be at or greater than a melting point temperature of lithium. The second temperature may be at or greater than a melting point temperature of silicon. The method may further include adding a metal (M) selected from the group consisting of: aluminum (Al), chromium (Cr), titanium (Ti), niobium (Nb), molybdenum (Mo), zirconium (Zr), yttrium (Y), cerium (Ce), and combinations to the precursor and heating the precursor and metal (M) to form a molten precursor; and centrifugally distributing the molten precursor by contacting the molten precursor with a rotating surface in a centrifugal atomizing reactor and solidifying the molten precursor to form a plurality of substantially round solid electroactive particles. The plurality of substantially round solid electroactive particles may include $Li_{4.4x}Si_xM_y$, where x is greater than 0 to less than or equal to about 0.85 and y corresponds to a weight percent of M that is greater than or equal to 0.1 wt. % to less than or equal to about 10 wt. %. s. The plurality of substantially round solid electroactive particles may have an average D50 diameter of less than or equal to about 20 micrometers.

In one aspect, the rotating surface may include one or more metal coatings. Each metal coating may include one or more of gold (Au), aluminum (Al), and silver (Ag). Each metal coating may have a thickness greater than or equal to about 0.01 μm to less than or equal to about 0.1 μm.

In one aspect, the method may further include, for each of the substantially round solid electroactive particles of the plurality of substantially round solid electroactive particles, passivating the metal (M) to form a passivation coating on the exposed surfaces of each of the substantially round solid electroactive particles.

In one aspect, passivating the metal (M) may include exposing the plurality of substantially round solid electroactive particles to oxygen or nitrogen.

In one aspect, the contacting may occur by introducing lithium from a lithium source to the mixing chamber using a first supply line and introducing silicon from a silicon source to the mixing chamber using a second supply line.

In one aspect, the method may further include removing the precursor from the mixing chamber.

In various aspects, the present disclosure provides a negative electroactive particle for an electrochemical cell that cycles lithium ions. The negative electroactive particle may include a core region and a passivation coating disposed on exposed surfaces of the core region. The core region may include $Li_{4.4x}Si_xM_y$, where x is greater than 0 to less than or equal to about 0.85, M is a metal (M) selected from the group consisting of: aluminum (Al), chromium (Cr), titanium (Ti), niobium (Nb), molybdenum (Mo), zirconium (Zr), yttrium (Y), cerium (Ce), and combinations thereof, and y corresponds to a weight percent of M that is greater than or equal to 0.1 wt. % to less than or equal to about 10 wt. %.

In one aspect, the passivation coating may be formed by oxidizing the metal (M).

In one aspect, the passivation coating may be a nitride layer formed by exposing the metal (M) in a nitrogen-containing environment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
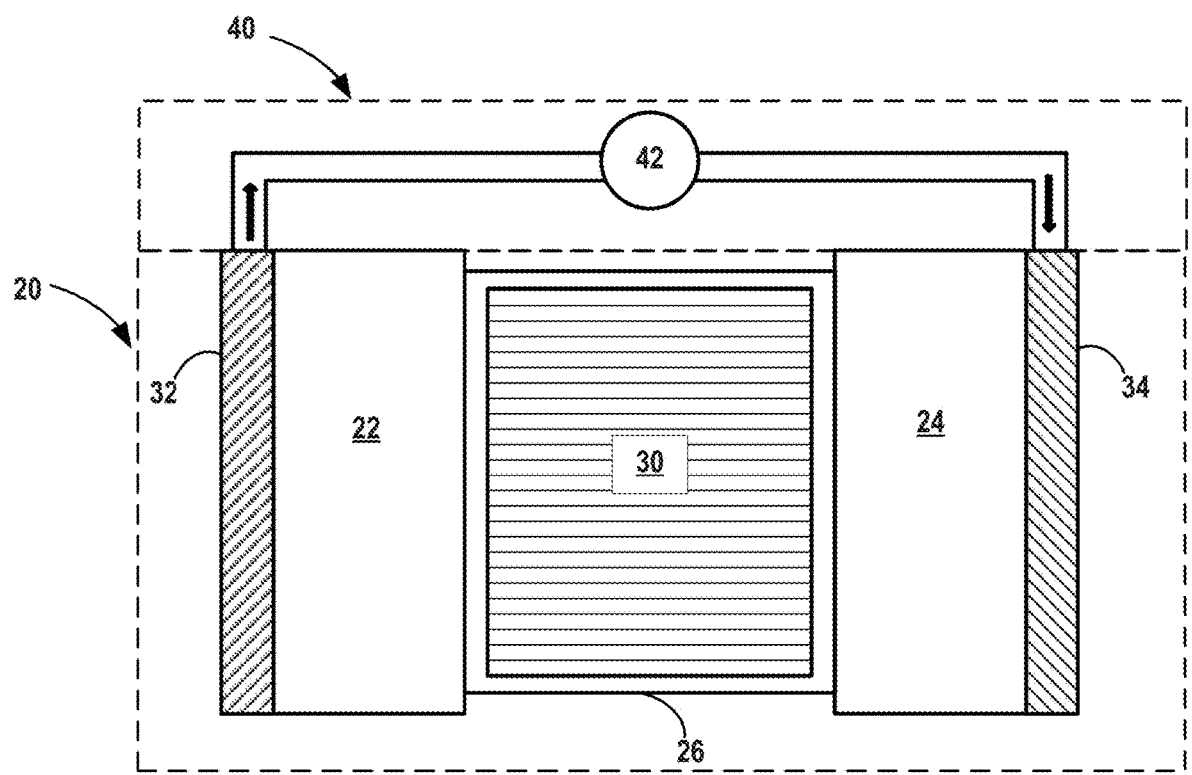
FIG. 1 is a schematic of an example electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising" is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to prelithiated electroactive materials for an electrochemical cell that cycles lithium ions and to methods of forming the prelithiated electroactive materials. The prelithiated electroactive materials may include spherical lithium-silicon particles and a passive surface film or passivation layer coated thereon. Methods may include centrifugally distributing a molten precursor in a centrifugal atomizing reactor, where the molten precursor includes a silicon alloy powder defined by $Li_{4.4x}Si_xM_y$, where x is greater than 0 to less than or equal to about 0.85, M is at least one of aluminum (Al), chromium (Cr), titanium (Ti), niobium (Nb), molybdenum (Mo), zirconium (Zr), yttrium (Y), and cerium (Ce), and y corresponds to a weight percent of M that is greater than or equal to 0.1 wt. % to less than or equal to about 10 wt. %.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte. For example, the separator 26 may be defined by a plurality of solid-state electrolyte particles (not shown).

A negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries that include solid-state electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In various aspects, the porous separator 26 and the electrolyte 30 in FIG. 1 may be replaced with a solid-state electrolyte ("SSE") (not shown) that functions as both an electrolyte and a separator. The solid-state electrolyte may be disposed between the positive electrode 24 and negative electrode 22. The solid-state electrolyte facilitates transfer of lithium ions, while mechanically separating and providing electrical insulation between the negative and positive electrodes 22, 24. By way of non-limiting example, solid-state electrolytes may include $LiTi_2(PO_4)_3$, $LiGe_2(PO_4)_3$, $Li_7La_3Zr_2O_{12}$, $Li_{3x}La_{2/3-x}TiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown) disposed in one or more layers so as to define the three-dimensional structure of the positive electrode 24. The electrolyte 30 may be introduced, for example after cell assembly, and contained within pores (not shown) of the positive electrode 24. For example, the positive electrode 24 may include a plurality of electrolyte particles (not shown).

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$), or a lithium nickel cobalt metal oxide ($LiNi_{(1-x-y)}Co_xM_yO_2$, where $0 < x < 0.2$, $y < 0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0 < x < 0.3$), or lithium iron fluorophosphate ($Li_2FePO_4F$).

In certain variations, the positive electroactive materials may be optionally intermingled with an electronically conducting material that provides an electron conduction path and/or at least one polymeric binder material that improves the structural integrity of the electrode. For example, the positive electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The positive electrode 24 may include greater than or equal to about 80 wt. % to less than or equal to about 99 wt. % of the positive electroactive material, greater than or equal to about 0 wt. % to less than or equal to about 15 wt. % of the electronically conducting material, and greater than or equal to about 0 wt. % to less than or equal to about 15 wt. %, and in certain aspects, optionally greater than or equal to about 0 wt. % to less than or equal to about 15 wt. %, of the at least one polymeric binder.

The negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, the negative electrode 22 may include a plurality of electrolyte particles (not shown).

The negative electrode 22 includes an electroactive material as a lithium host material capable of functioning as a negative terminal of a lithium ion battery. For example, in various aspects, the negative electroactive material may be a silicon-based electroactive material, and in further variations, the negative electroactive material may include a combination of silicon and graphite.

As discussed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 22 by an electrochemical reduction reaction. The battery 20 may be recharged or regenerated after a partial or full discharge of its available capacity by an external power source, which reverses the electrochemical reactions that transpired during discharge.

In certain instances, however, especially in instances of silicon-containing electroactive materials, a portion of the intercalated lithium remains with the negative electrode 22 due to, for example, conversion reactions and/or the formation of $Li_xSi$ and/or a solid electrolyte interphase (SEI) layer (not shown) on the negative electrode 22 during the first cycle, as well as ongoing lithium loss due to, for example, continuous solid electrolyte interphase (SEI) breakage. The solid electrolyte interface (SEI) layer can form over the surface of the negative electrode (anode), which is often generated by reaction products of anode material, electrolyte reduction, and/or lithium ion reduction. Such permanent loss of lithium ions may result in a decreased specific energy and power in the battery 20. For example, the battery 20 may experience an irreversible capacity loss of greater than or equal to about 5% to less than or equal to about 30% after the first cycle.

Lithiation, for example pre-lithiation of the electroactive materials (e.g., silicon) prior to incorporation into the battery 20, may compensate for such lithium losses during cycling. For example, an amount of lithium prelithiation together with appropriate negative electrode capacity and/or positive electrode capacity ratio (N/P ratio) can be used to control electrochemical potential within an appropriate window so as to improve the cycle stability of the battery 20. Prelithiation can drive down the potential for silicon-containing electrodes. By way of non-limiting example, lithiation of silicon by direct reaction can be expressed by: $4.4xLi+ Si \rightarrow Li_{4.4x}Si$, where $0 \leq x \leq 1$, while for electrochemical lithiation of silicon, it can be expressed as $4.4xLi^+ + 4.4xe^{-+} Si \rightarrow Li_{4.4x}Si$. In each instance, the reserved lithium can compensate for lithium lost during cycling, including during the first cycle, so as to decrease capacity loss over time.

Common lithiation methods, such as electrochemical, direct contact, and lamination methods, however, often require half-cell fabrication and teardown and/or high temperature chemical processes. Furthermore, it can be difficult to control an extent of lithiation that occurs during these processes. Further, these processes often involve highly reactive chemicals and require additional manufacturing steps. These may be time consuming and potentially expensive processes. Further, such processes also commonly produce unworkable materials, for example anodes having undesirable thicknesses. The present disclosure provides improved prelithiated negative electroactive materials, and methods of forming the same, which can help to address these challenges.

For example, in accordance with various aspects of the present disclosure, the silicon-based electroactive materials may be a prelithiated electroactive material 122 including a silicon alloy powder that comprises a plurality of substantially spherical particles 124 having a composition of $Li_{4.4x}Si_xM_y$, where x is greater than 0 to less than or equal to about 0.85, M is at least one of aluminum (Al), chromium (Cr), titanium (Ti), niobium (Nb), molybdenum (Mo), zirconium (Zr), yttrium (Y), and cerium (Ce), and y corresponds to a weight percent of M that is greater than or equal to 0.1 wt. % to less than or equal to about 10 wt. %.

The substantially spherical particles 124 may have an average diameter (D50) less than or equal to about 40 μm, optionally less than or equal to about 20 μm, optionally less than or equal to about 10 μm, and in certain aspects, optionally less than or equal to about 5 μm. For example, the average diameter (D50) for the substantially spherical particles 124 may be greater than or equal to about 1 μm to less than or equal to about 40 μm, greater than or equal to about 1 μm to less than or equal to about 20 μm, and in certain aspects, optionally greater than or equal to about 1 μm to less than or equal to about 10 μm.

Figure 2:
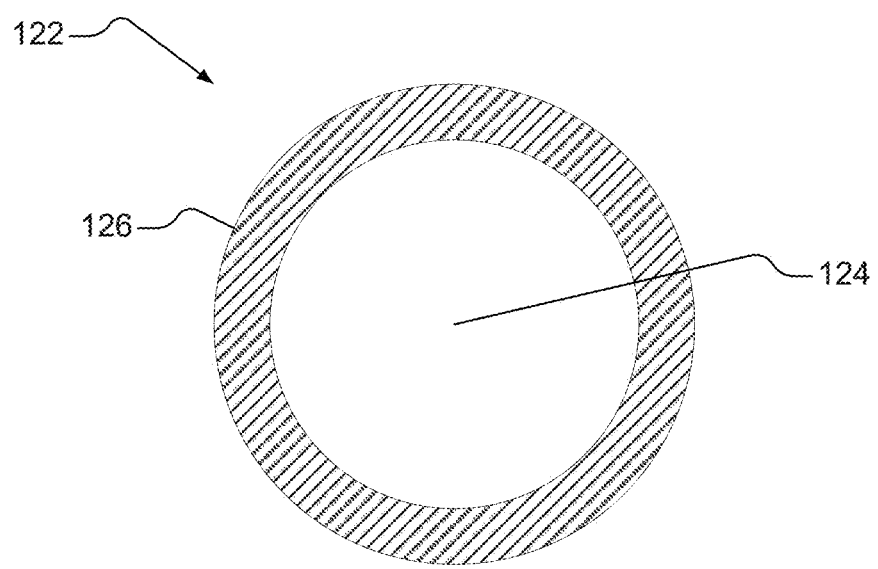
FIG. 2 is a cross-sectional illustration of an exemplary prelithiated electroactive material in accordance with various aspects of the present disclosure.

Passivation, for example upon the exposure to oxygen or nitrogen, of the at least one additional metal (M) of the substantially spherical particles 124, may form a passive surface film or passivation layer 126 on the surfaces of the substantially spherical particles 124, so as to form a core-shell type structure, such as illustrated in FIG. 2. For example, the passivation layer 126 may be a continuous, dense coating including oxides (e.g., $Al_2O_3$), silicides (e.g., $Ti_5Si_3$), nitrides, or mixtures. The passivation layer 126 may prevent lithium-silicon alloy particles from reacting with oxygen, moisture (e.g., $H_2O$), organic solvents (e.g., N-methyl-2-pyrrolidone (NMP)), and the like to improve the safety of the lithium-silicon alloy particles both during manufacturing and transport as well as processes for electrode fabrication, while allowing for high lithium ion ($Li^+$) diffusion.

With renewed reference to FIG. 1, in certain variations, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The negative electrode 22 may include greater than or equal to about 10 wt. % to less than or equal to about 99 wt. % of the silicon-based electroactive materials, greater than or equal to about 0 wt. % to less than or equal to about 20 wt. % of the electronically conducting material, and greater than or equal to about 0 wt. % to less than or equal to about 20 wt. %, and in certain aspects, optionally greater than or equal to about 1 wt. % to less than or equal to about 20 wt. %, of the at least one polymeric binder. In certain variations, the negative electrode 22 may also include greater than or equal to about 0 wt. % to less than or equal to about 89 wt. % of a graphite active material.

In various aspects, the present disclosure provides methods of making prelithiated, silicon-based electroactive materials for use in negative electrodes, such as negative electrode 22 illustrated in FIG. 1. For example, the present disclosure contemplates a method of making prelithiated, silicon-based electroactive materials using a centrifugal/gas atomization process. In centrifugal atomization processing, a molten material is directed towards at least one rotating disc or cup, where melt drops form and fly away from the rotating disc or cup to solidify and form spherical particles. Thus, in certain aspects, the method comprises forming a precursor (including, for example, silicon, lithium, and an additional metal (M)) and centrifugally distributing the precursor by contacting the precursor with a rotating surface in a centrifugal atomizing reactor and solidifying the precursor to form a plurality of substantially round electroactive particles comprising an alloy of lithium and silicon and having a D50 diameter of less than or equal to about 20 micrometers (μm).

Figure 3:
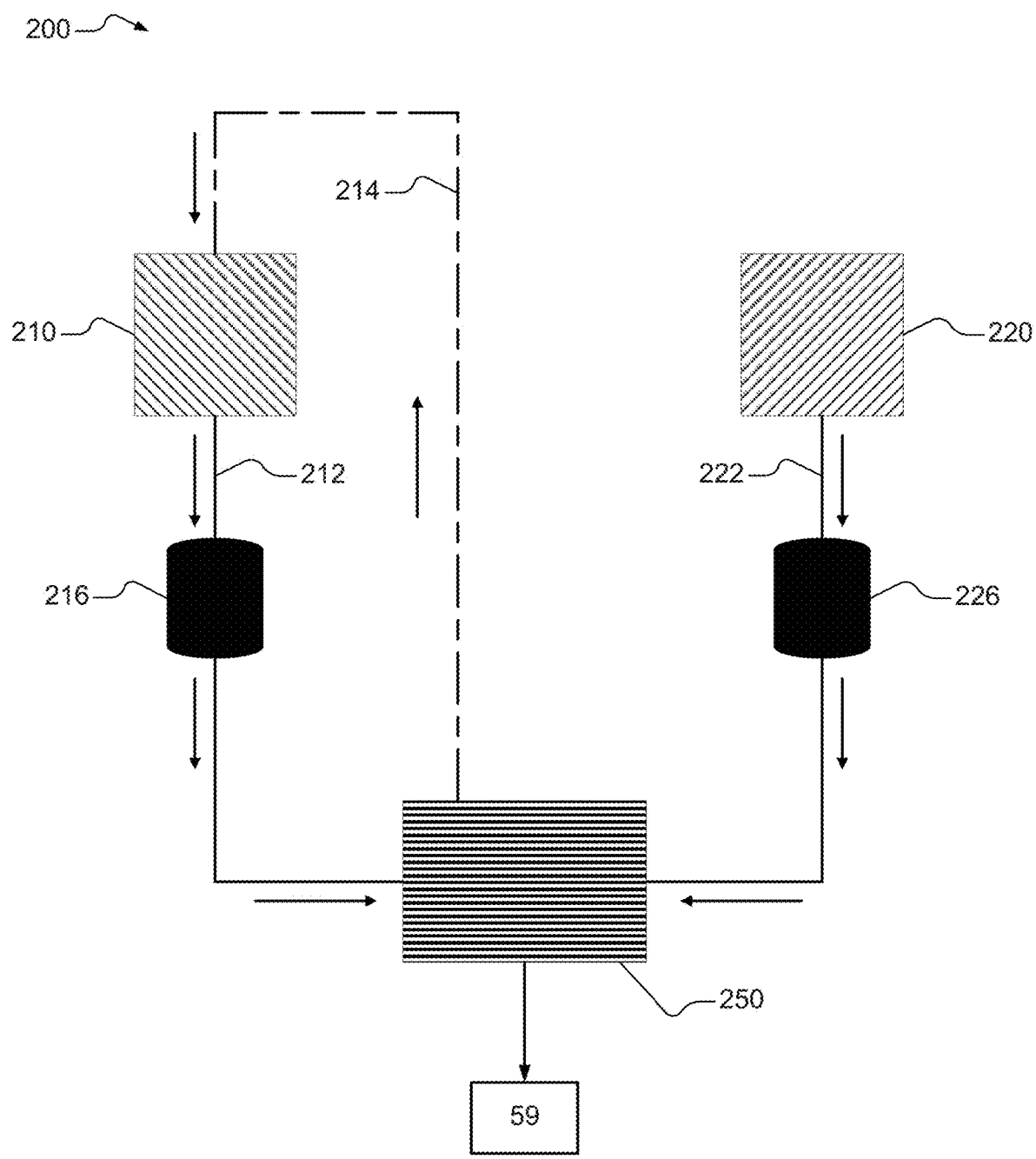
FIG. 3 shows an exemplary impingement mixing process in accordance with various aspects of the present disclosure.

FIG. 3 shows an exemplary method for forming a precursor including, for example, silicon, lithium, and an additional metal (M), where the additional metal (M) is at least one of aluminum (Al), chromium (Cr), titanium (Ti), niobium (Nb), molybdenum (Mo), zirconium (Zr), yttrium (Y), and cerium (Ce). As illustrated in Table 1, using conventional methods, co-melting of silicon and lithium can often be difficult, for example, because the melting temperature of silicon is higher than the boiling temperature of lithium so as to cause undesirable lithium evaporation and the density of silicon is much higher than that of lithium causing gravity separation, such as a floating molten lithium lump.

TABLE 1

Comparison of Material Properties

| Material | Density (g/cm³) | Melting Point (° C. \| K) | Boiling Point (° C. \| K) |
|---|---|---|---|
| Li | 0.534 | 180.5 \| 453.7 | 1342 \| 1603 |
| Si | 2.329 | 1414 \| 1687 | 3265 \| 3538 |

The present disclosure provides a method for forming the precursor including, for example, silicon, lithium, and an additional metal (M), where the additional metal (M) is at least one of aluminum (Al), chromium (Cr), titanium (Ti), niobium (Nb), molybdenum (Mo), zirconium (Zr), yttrium (Y), and cerium (Ce), that minimizes gravity separation and lithium evaporation during the centrifugal step and improves alloy homogeneity and reduces processing time. In certain variations, the present disclosure uses an impingement mixing process to form the precursor.

As illustrated in FIG. 3, the impingement process 200 includes a lithium source or supply 210 and silicon supply 220. The lithium supply 210 includes melted lithium. The silicon source or supply 220 includes melted silicon. The lithium supply 210 may have an internal temperature higher than the melting temperature of lithium. The silicon supply 220 may have an internal temperature less than the boiling point of silicon. The lithium supply 210 may have an internal pressure greater than or equal to about 10 PSI, optionally greater than or equal to about 20 PSI, and in certain aspect, optionally greater than or equal to about 50 PSI. The lithium supply 210 may have an internal pressure less than or equal to about 4000 PSI. The silicon supply 220 may have an internal pressure greater than or equal to about 10 PSI, optionally greater than or equal to about 20 PSI, and in certain aspect, optionally greater than or equal to about 50 PSI. The silicon supply 220 may have an internal pressure less than or equal to about 4000 PSI.

The melted lithium travels from the lithium supply 210 towards and to a mixing chamber 250. For example, the melted lithium travels in a supply line 212 from the lithium supply 210 to the mixing chamber 250. The melted silicon travels from the silicon supply 220 towards and to the mixing chamber 250. For example, the melted silicon travels in a supply line 222 from the silicon supply 220 to the mixing chamber 250. For example, the silicon supply 220 may have an internal temperature less than or equal to about 1600° C. The mixing chamber 250 may be an airtight mixing chamber. The mixing chamber 250 may have an internal temperature that is less than the boiling temperature of silicon.

The melted lithium may have a first temperature. The melted silicon may have a second temperature. The second temperature may be greater than the first temperature. For example, the first temperature may be greater than or equal to about 180.5° C. (i.e., melting point temperature of lithium) to less than or equal to about 1342° C. (i.e., boiling point temperature of lithium). The second temperature may be greater than or equal to about 1414° C. (i.e., melting point temperature of silicon) to less than or equal to about 3265° C. (i.e., boiling point temperature of silicon). When the lower temperature lithium melt meets the higher temperature silicon melt in the mixing chamber 250, a portion of the silicon melt solidifies so as to form a semiliquid mixture, where solid-state silicon particles are surround by (dispersed within) a mixture of molten lithium and silicon. The particle sizes of the solid-state silicon particles is dependent on nucleation factors, including cooling rate (i.e., the temperature different between the molten lithium and the molten silicon entering the mixing chamber) and unit mass ratio (i.e., the amount of molten lithium and molten silicon entering the mixing chamber per unit time). For example, the solid-state silicon particles have an average particle diameter greater than or equal to about 1 nm to less than or equal to about 1 mm. In such instances, the contact area between the solid-state silicon particles and the molten lithium is improved such that the melting efficiency of silicon is improved.

Mixing occurs in the mixing chamber 250 in an argon-based environment. The mixing occurs in a closed system such that all lithium (evaporated or not) takes part in mixing reaction. Further, the mixture temperature is tuned so as to minimize lithium evaporation. The semiliquid mixture is cooled within the mixing chamber 250 and the solid-state precursor 59 is extracted from the mixing chamber 250. Excess lithium travels from the mixing chamber 250 to the lithium supply 210 via return line 214.

In certain instances, the method further employ one or more metering pumps 216, 226. The rate at which the silicon and lithium meet, as well as the flow rates through each of the lithium supply line 212 and the silicon supply line 222, may be selected based on the targeted mixture (e.g., $Li_{4.4x}Si$, where 0≤x≤1). For example, a first metering pump 216 may be disposed downstream the lithium supply 210 and upstream the mixing chamber 250. Supply line 212 may travel to and from the first metering pump 216. A second metering pump 226 may be disposed downstream of the silicon supply 220 and upstream the mixing chamber 250. Supply line 222 may travel to and from the second metering pump 226. In each instance, the metering pump 216, 226 may be used to define the pressure and rate at which the respective materials enter the mixing chamber 250. In certain instances, by way of non-limiting example, lithium may be enter the mixing chamber 250 at a rate of about 15 gram/second, and silicon may enter the mixing chamber 250 at a rate of about 28 grams/second, so as to form $Li_{2.2}Si$.

Figure 4:
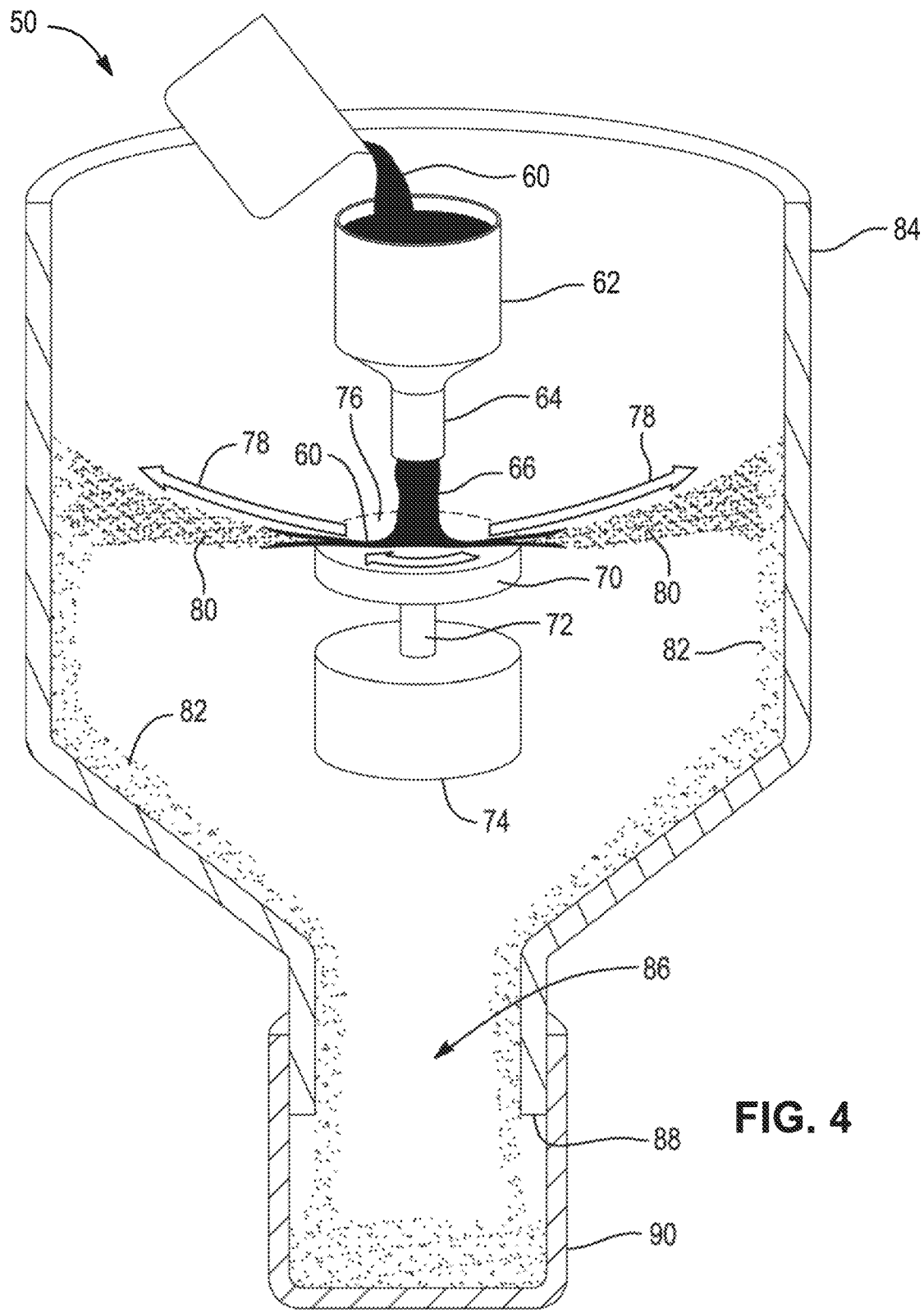
FIG. 4 shows an exemplary centrifugal atomizing reactor used in accordance with various aspects of the present disclosure to form prelithiated electroactive materials like those illustrated in FIG. 2, and for use in an electrochemical battery cell, such as illustrated in FIG. 1.

FIG. 4 shows an exemplary centrifugal atomizing reactor 50. It should be noted that the reactor 50 is a simplified version and may contain various other equipment and components. One suitable multistage centrifugal atomizing reactor suitable for forming the plurality of electroactive particles is described in U.S. patent application Ser. No. 16/681, 321 filed on Nov. 12, 2019 (now U.S. Pat. No. 11,554,417, issued on Jan. 17, 2023) titled "Article for Producing Ultra-Fine Powders and Method of Manufacture Thereof," the relevant portions of which are incorporated herein by reference. A precursor 59 prepared, for example, using the impingement progress 200 illustrated in FIG. 2 can be conveyed in batches or continuously from an upstream furnace where a molten precursor 60 is formed and introduced to a distribution vessel or tundish 62. In various aspects, an additional metal (M) is added to the precursor 59 to form a molten precursor 60 that includes the additional metal (M). The additional metal may be a pure metal or metal hydride ($MH_x$) including at least one of aluminum (Al), chromium (Cr), titanium (Ti), niobium (Nb), molybdenum (Mo), zirconium (Zr), yttrium (Y), and cerium (Ce). In each instance, the molten precursor 60 may have a temperature greater than or equal to about 800° C. to less than or equal to about 1000° C.

The tundish 62 has at least one outlet port 64 with a suitable diameter to facilitate a quick discharge of the molten precursor material 60. The number and the diameter of the outlet ports 64 may be adjusted to control particle size during and after atomization process, as would be appreciated by those of skill in the art. Further, the tundish 62 may rotate or have a source of pressure to enhance discharge via the outlet port 64. A stream 66 of molten precursor material 60 is discharged from the outlet port 64. The molten precursor material 60 includes silicon, lithium, and an additional metal (M). For example, the molten precursor material 60 includes a composition of $Li_{4.4x}Si_xM_y$, where x is greater than 0 to less than or equal to about 0.85, M is at least one of aluminum (Al), chromium (Cr), titanium (Ti), niobium (Nb), molybdenum (Mo), zirconium (Zr), yttrium (Y), and cerium (Ce), and y corresponds to a weight percent of M that is greater than or equal to 0.1 wt. % to less than or equal to about 10 wt. %.

The stream 66 contacts a surface 76 of a rotating component 70 that may be in the form of a disc or cup. The rotating component 70 is in rotary communication with a shaft 72 and a motor 74. Rotary motion is transmitted from the motor 74 via the shaft 72 to the rotating component 70. The rotary motion of the rotating component 70 imparts a centrifugal force to the molten precursor material 60, which causes it to distribute and comminute the precursor material 60 in a centrifugal direction 78 in the reactor 50 outwards from the central axis defined by the shaft 72. As shown, the molten precursor material 60 contacts the rotating surface 76 and as it passes in an outward direction creates droplets 80 that solidify to form a plurality of substantially round solid electroactive particles 82.

Although not shown, in various aspects, the rotating component 70 includes one or more metal coatings, where each metal coating includes gold (Au), aluminum (Al), silver (Ag), or the like. Each metal coating may have a thickness greater than or equal to about 0.01 µm to less than or equal to about 0.1 µm. Such coatings may improve the wettability of the molten precursor material 60, so as to decrease the thickness of the layer of molten precursor material 60 disposed on the rotating component 70 in the centrifugal direction 78. A decreased thickness of the layer of molten precursor material 60 disposed on the rotating component 70 in the centrifugal direction 78 may decrease particles sizes of the substantially round solid electroactive particles 82.

Further, while not shown, ultrasonic or mechanical vibration may be applied to the rotating component 70 to facilitate comminution of the molten precursor material 60 as well as de-agglomeration of particles. The droplets 80 are thrust outward. The solid particles 82 are outwardly thrust towards a wall 84 of the reactor 50 and then fall into an outlet region 86 that includes an outlet 88. The ultrafine solid particles 82 are transported by gravity to the outlet 88. As shown, a collection vessel 90 is connected to the outlet 88 and collects the particles 82. In certain variations, though not illustrated, the outlet 88 may alternatively be in fluid communication with additional reactor chambers, for example, for gas phase coating of electroactive material particles, as would be appreciated by those of skill in the art.

The solidified particles formed by such a process may be relatively small (e.g., fine or ultrafine) and have a substantially round shape. "Substantially round-shaped" includes particles having low aspect ratios and with a morphology or shape including spherical, orbed, spheroidal, egg-shaped, elliptical, and the like. In certain variations, the particles have a spherical shape. Further, the solid particles may have an average diameter (D50). An average diameter (D50) means a cumulative 50% point of diameter (or 50% pass particle size) for the plurality of solid particles. In certain aspects, the average diameter (D50) of the plurality of electroactive solid particles formed by a centrifugal atomization process is less than or equal to about 40 µm, optionally less than or equal to about 20 µm, optionally less than or equal to about 10 µm, and in certain aspects, optionally less than or equal to about 5 µm. For example, the average diameter (D50) for the plurality of solid electroactive particles formed may be greater than or equal to about 1 µm to less than or equal to about 20 µm, and in certain aspects, optionally greater than or equal to about 1 µm to less than or equal to about 10 µm.

The plurality of electroactive solid particles formed by a centrifugal atomization process may be relatively monodisperse, for example, having a narrow polydispersity index or variation in particle sizes among the plurality of particles formed. In one aspect, the particle distribution is narrow having a polydispersity index of less than or equal to about 1.2. In certain aspects, the centrifugal atomization process of forming the plurality of electroactive materials may provide a high yield for the target or predetermined particle size diameter range. For example, where an average particle diameter (D50) is selected to be greater than or equal to about 1 µm to less than or equal to about 20 µm, an overall yield from the process for solid particles having the predetermined size range may be greater than or equal to about 10% to less than or equal to about 90%. These uniform diameter electroactive materials formed from an alloy of lithium and silicon may be used in various electrochemical cells/batteries and energy storage devices, such as negative electrode 22 and battery 20 illustrated in FIG. 1.

In certain variations, an environment in the centrifugal atomizing reactor may be substantially free of gaseous oxygen-containing species to avoid reaction with lithium. For example, the environment may have less than or equal to about 0.5% by weight of any oxygen-bearing species in a gas phase, for example, oxygen gas, water, and the like. The environment in the reactor optionally has a low water/moisture level reflected by a relative humidity (RH) of less than or equal to 0.5% at reaction condition temperatures.

The centrifugal atomizing reactor may be capable of high throughput, for example, having a mass flow rate of greater than or equal to 50 kg/hour to less than or equal to about 500 kg/hour in forming the particles of electroactive materials with the desired range of average particle sizes. Higher flow rates may also be possible, so long as the particles formed have the desired average particle diameter (D50). The flow rate has an effect on particle size. For example, the higher the flow rate of the molten material, the larger size of the particles that are produced. So the flow rate may be limited by the desired size of the particles.

In certain aspects, a temperature in the centrifugal atomizing reactor during centrifugal distribution of a molten precursor may be greater than or equal to 400° C. to less than or equal to about 1,000° C. Higher temperatures may help reduce viscosity and improve film disintegration during the centrifugal atomization process. In certain variations, a temperature in the centrifugal atomizing reactor during centrifugal distribution of a molten precursor may be greater than or equal to 400° C. to less than or equal to about 800° C. Compared to other pre-lithiation methods, centrifugal/gas atomization provided by certain aspects of the present disclosure provides a means to precisely control the extent of pre-lithiation and phases formed.

Thus, in various aspects, a centrifugal/gas atomizer reactor is used to produce particles that comprise a prelithiated, silicon-based electroactive materials. Such a centrifugal/gas atomizer reactor provides high throughput production of the particles comprising the prelithiated, silicon-based electroactive materials having a relatively homogenous size distribution and a high yield for a predetermined average particle size diameter. The prelithiated, silicon-based electroactive materials include a composition of $Li_{4.4x}Si_xM_y$, where x is greater than 0 to less than or equal to about 0.85, M is at least one of aluminum (Al), chromium (Cr), titanium (Ti), niobium (Nb), molybdenum (Mo), zirconium (Zr), yttrium (Y), and cerium (Ce), and y corresponds to a weight percent of M that is greater than or equal to 0.1 wt. % to less than or equal to about 10 wt. %.

Such prelithiated, silicon-based electroactive materials can reduce the lithium consumption and initial stress during formation cycles and has the benefit of the electroactive material comprising silicon undergoing an initial volumetric expansion (e.g., about 300%) due to lithiation prior to being incorporated into an electrode to enhance the mechanical properties of the electrode that is initially formed. Conventionally, the electroactive material comprising silicon is incorporated into an electrode (e.g., mixed in with the polymeric matrix and other electrode components) and then lithiated where the initial expansion occurs. This expansion upon lithiation can cause mechanical stress and potential damage to not only the electroactive particles, but also the surrounding composite. When electroactive materials are formed from the lithium and silicon alloys in accordance with the present technology, the materials have already undergone an initial volumetric expansion (e.g., about 300%) and thus incorporating them into an electrode causes a smaller expansion and contraction stress ((e.g., about 200%) during lithium cycling.

An electrode, for example negative electrode 22 illustrated in FIG. 1, may be made by mixing particles including prelithiated, silicon-based electroactive materials, such as prepared using a centrifugal atomizing reactor as illustrated in FIG. 4, into a slurry with a polymeric binder compound, a non-aqueous solvent, optionally a plasticizer, and optionally electrically conductive particles. The slurry can be mixed or agitated, and then thinly applied to a substrate, for example via a doctor blade. The substrate can be a removable substrate or alternatively a functional substrate, such as a current collector (such as, a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate, it may be necessary to extract or remove any remaining plasticizer prior to incorporation into the battery cell.

A lithium-ion battery, such as battery 20 illustrated in FIG. 1, incorporating prelithiated, silicon-based electroactive materials, prepared in accordance with the present disclosure, maintains charge capacity (e.g., performs within a preselected range or other targeted high capacity use) for at least about 1,000 hours of battery operation, optionally greater than or equal to about 1,500 hours of battery operation, optionally greater than or equal to about 2,500 hours or longer of battery operation, and in certain aspects, optionally greater than or equal to about 5,000 hours or longer (active cycling).

In certain aspects, the lithium-ion battery incorporating prelithiated, silicon-based electroactive materials, prepared in accordance with the present disclosure, maintains charge capacity and thus is capable of operating within 20% of target charge capacity for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years.

In other aspects, the lithium-ion battery incorporating prelithiated, silicon-based electroactive materials, prepared in accordance with the present disclosure, is capable of operating at less than or equal to about 30% change in a preselected target charge capacity (thus having a minimal charge capacity fade), optionally at less than or equal to about 20%, optionally at less than or equal to about 15%, optionally at less than or equal to about 10%, and in certain variations, optionally at less than or equal to about 5% change in charge capacity for a duration of at least about 100 deep discharge cycles, optionally at least about 200 deep discharge cycles, optionally at least about 500 deep discharge cycles, optionally at least about 1,000 deep discharge cycles.

Stated in another way, in certain aspects, a lithium-ion battery or electrochemical cell incorporating prelithiated, silicon-based electroactive materials prepared in accordance with the present disclosure maintains charge capacity and is capable of operation for at least about 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a negative electrode material for an electrochemical cell that cycles lithium ions, the method comprising:

contacting a precursor comprising silicon, lithium, and a metal (M) selected from the group consisting of: aluminum (Al), chromium (Cr), titanium (Ti), niobium (Nb), molybdenum (Mo), zirconium (Zr), yttrium (Y), cerium (Ce), and combinations thereof with a rotating surface in a centrifugal atomizing reactor and solidifying the precursor to form a plurality of substantially round solid electroactive particles comprising $Li_{4.4x}Si_xM_y$, where x is greater than 0 to less than or equal to about 0.85 and y corresponds to a weight percent of M that is greater than or equal to 0.1 wt. % to less than or equal to about 10 wt. %.

2. The method of claim 1, wherein the rotating surface comprises one or more metal coatings, wherein each metal coating comprises one or more of gold (Au), aluminum (Al), and silver (Ag) and has a thickness greater than or equal to about 0.01 µm to less than or equal to about 0.1 µm.

3. The method of claim 1, wherein the metal (M) forms a passivation coating on exposed surfaces of each of the substantially round solid electroactive particles of the plurality of substantially round solid electroactive particles when exposed to oxygen or nitrogen.

4. The method of claim 3, wherein the method further comprises:

passivating the metal (M) comprises exposing the plurality of substantially round solid electroactive particles to oxygen or nitrogen.

5. The method of claim 1, wherein a temperature in the centrifugal atomizing reactor is greater than or equal to 400° C. to less than or equal to 1,000° C. during the contacting.

6. The method of claim 1, wherein an environment in the centrifugal atomizing reactor has less than or equal to about 0.5% by weight of any oxygen-bearing species.

7. The method of claim 1, wherein a flow rate of the centrifugal atomizing reactor is greater than or equal to 50 kg/hour to less than or equal to about 500 kg/hour.

8. The method of claim 1, wherein an average D50 diameter of the plurality of substantially round solid electroactive particles is greater than or equal to about 1 μm to less than or equal to about 20 μm and the plurality of substantially round solid electroactive particles has a polydispersity index of less than or equal to about 1.2.

9. The method of claim 1, wherein the method further comprises:
preparing the precursor, wherein preparing the precursor comprises:
forming an admixture by contacting a first material comprising lithium having a first temperature and a second material comprising silicon having a second temperature in a mixing chamber to form the first admixture, wherein the first material and the second material each enters the mixing chamber at a pressure greater than or equal to about 10 PSI and the second temperature is greater than the first temperature.

10. The method of claim 9, wherein the first temperature is at or greater than a melting point temperature of lithium, and the second temperature is at or greater than a melting point temperature of silicon.

11. The method of claim 9, wherein the contacting occurs by introducing lithium from a lithium source to the mixing chamber using a first supply line and introducing silicon from a silicon source to the mixing chamber using a second supply line, and
wherein the first supply line comprises a first metering pump and the second supply line comprises a second metering pump, the first metering pump controls the pressure and rate at which the lithium enters the mixing chamber, and the second metering pump controls the pressure and rate at which the silicon enters the mixing chamber.

12. The method of claim 11, wherein the method further comprises:
removing the admixture from the mixing chamber, adding the metal (M) to the admixture, and heating the admixture and metal (M) to form the precursor.

13. A method of making a negative electrode material for an electrochemical cell that cycles lithium ions, the method comprising:
contacting a first material comprising lithium and having a first temperature and a second material comprising silicon and having a second temperature in a mixing chamber to form a precursor, wherein the first material and the second material each enters the mixing chamber at a pressure greater than or equal to about 10 PSI and the first temperature is at or greater than a melting point temperature of lithium and the second temperature is at or greater than a melting point temperature of silicon;
adding a metal (M) selected from the group consisting of: aluminum (Al), chromium (Cr), titanium (Ti), niobium (Nb), molybdenum (Mo), zirconium (Zr), yttrium (Y), cerium (Ce), and combinations to the precursor and heating the precursor and the metal (M) to form a molten precursor; and
centrifugally distributing the molten precursor by contacting the molten precursor with a rotating surface in a centrifugal atomizing reactor and solidifying the molten precursor to form a plurality of substantially round solid electroactive particles comprising $Li_{4.4x}Si_xM_y$, where x is greater than 0 to less than or equal to about 0.85 and y corresponds to a weight percent of M that is greater than or equal to 0.1 wt. % to less than or equal to about 10 wt. % and having an average D50 diameter of less than or equal to about 20 micrometers.

14. The method of claim 13, wherein the rotating surface comprises one or more metal coatings, wherein each metal coating comprises one or more of gold (Au), aluminum (Al), and silver (Ag) and each metal coating has a thickness greater than or equal to about 0.01 μm to less than or equal to about 0.1 μm.

15. The method of claim 13, wherein the metal (M) forms a passivation coating on exposed surfaces of each of the substantially round solid electroactive particles of the plurality of substantially round solid electroactive particles when exposed to oxygen or nitrogen.

16. The method of claim 13, wherein passivating the metal (M) comprises exposing the plurality of substantially round solid electroactive particles to oxygen or nitrogen.

17. The method of claim 13, wherein the contacting occurs by introducing lithium from a lithium source to the mixing chamber using a first supply line and introducing silicon from a silicon source to the mixing chamber using a second supply line, and the method further comprises removing the precursor from the mixing chamber.

* * * * *